INVENTOR:
ERNEST R. CARLSON,
BY T. E. Kristofferson
HIS ATTORNEY.

June 13, 1961 E. R. CARLSON 2,988,710
DIGITAL FREQUENCY GENERATOR
Filed Dec. 19, 1958 2 Sheets-Sheet 2

INVENTOR:
ERNEST R. CARLSON,
BY T. E. Kristofferson
HIS ATTORNEY.

2,988,710

DIGITAL FREQUENCY GENERATOR

Ernest R. Carlson, Clay, N.Y., assignor to General Electric Company, a corporation of New York Filed Dec. 19, 1958, Ser. No. 781,503
6 Claims. (Cl. 332—16)

My invention relates to an arrangement for generating a signal whose frequency may be precisely controlled over a given frequency range and more particularly to a frequency generator wherein the frequency of the output signal may be indicative of an input binary digital number.

The prior art discloses analogue techniques for producing shifts in signal frequency, and generation of frequencies indicative of an analogue voltage. However, these techniques are limited in precision and have restricted accuracy, repeatability and coherence. Analogue frequency generation techniques depend upon the setting of continuously variable elements to determine the frequency generated. The frequency which is generated is desired to be indicative of the magnitude of an analogue voltage, which is in some manner dependent upon a variable impedance. To precisely generate a frequency indicative of a given analogue voltage it is not only necessary that the analogue voltage be of the same value each time the desired frequency is to be generated, but the frequency control element must be precisely set. For example, a common frequency determining element is a voltage sensitive capacitor, which may change characteristics with change in ambient temperature, and as the name implies changes capacitive value with applied voltage. The precision of setting of the presently used frequency control elements, and the repeatability of magnitude of given analogue voltages, dependent in some manner on the setting of a variable impedance, render presently known analogue frequency generation techniques unsuitable for certain applications where precise and repeatably accurate frequency generation is required. If it is required that the generated frequency be coherent with a second frequency, the above-mentioned factors eliminate analogue frequency generation where precise coherence is desired.

To provide a frequency generator which does not possess the above-mentioned deficiencies, I provide a device wherein a parallel binary digital number is read into the system for accurately controlling precise frequency shifts in a high frequency carrier. A precise incremental shift of frequency is controlled by each bit of the digital number so that the ultimate frequency at the output of the device is in turn precisely controlled. The frequencies added to the carrier are all derived from a common source and are in precise coherent relationships to the base frequency.

Accordingly, it is an object of my invention to provide a frequency generator wherein the generated frequency is a precise indication of a read-in binary digital number.

It is another object of my invention to provide a frequency generator wherein the output frequency may be controlled in precise incremental steps over a desired frequency range.

A further object of my invention is to provide a frequency generator adapted to generate a programmed frequency or to produce a programmed frequency shift.

In carrying out the objects of my invention in one form thereof, I provide a high frequency carrier, hereinafter referred to as a vehicle frequency signal or vehicle signal, and allow this vehicle signal to be operated on in a series of single sideband suppressed carrier modulators. Modulating frequencies, which are in binary relationship, are supplied to the several modulators. A parallel binary digital number, expressed as direct voltages is applied to the modulators to either permit or prevent shift in the frequency transmitted therethrough by each of the binary related frequency signals. The output of the final modulator in the series is a signal which represents the vehicle frequency plus the shifts introduced by the several modulators under the control of the read-in parallel binary digital number.

The novel features of my invention are set forth with particularity in the appended claims. My invention itself, however, both as to its organization and method of operation, together with further objects and advantages thereof, may best be understood by reference to the following illustration and conjunctive discussion illustrating one of the many potential uses of my device, and an embodiment of the invention itself.

Accordingly, in FIG. 1, my invention is shown in block diagram form as included in a Doppler data processing system.

There are many potential uses of my device but by way of example it may be noted that in a data processing system wherein a Doppler frequency shift is expressed as an output binary digital number, analogue techniques presently used to compare the digital output with a Doppler shifted wave input have been found to have the deficiencies previously mentioned. Where my invention is employed, as in FIG. 1, however, the binary digital output may be translated into a signal whose frequency is indicative of the binary digital output and this frequency then compared with the frequency of the Doppler shifted signal to give a constant check on the accuracy of the data processing system.

Figure 1:
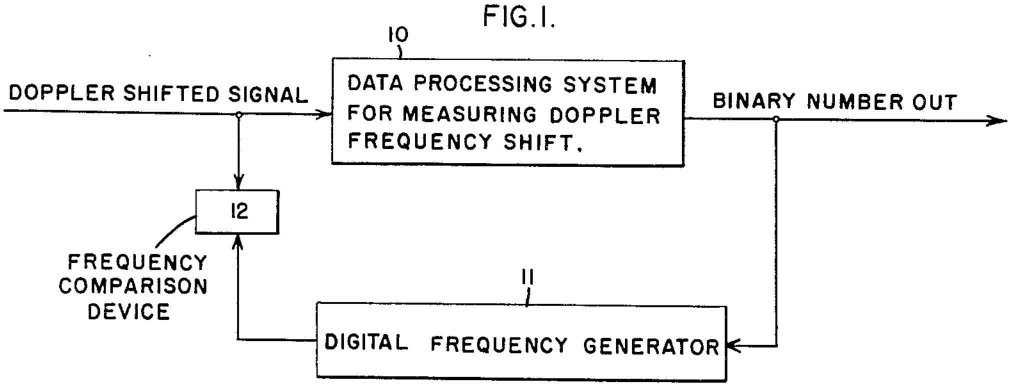

The system illustrated in FIG. 1 comprises a data processing system 10 for measuring a Doppler frequency shift, a digital frequency generator 11 constructed in accordance with my invention and a frequency comparison device 12. In operation a Doppler shifted signal is applied to data processing system 10 which yields a binary digital number output indicative of the signal input or the Doppler shift of the signal input. As a check on the data processing system 10 the binary digital number is read into the digital frequency generator 11 which generates a frequency which is a precise indication of the read-in number. The generated frequency is then compared with the Doppler shifted signal in frequency comparison device 12 to detect error.

Figure 2:
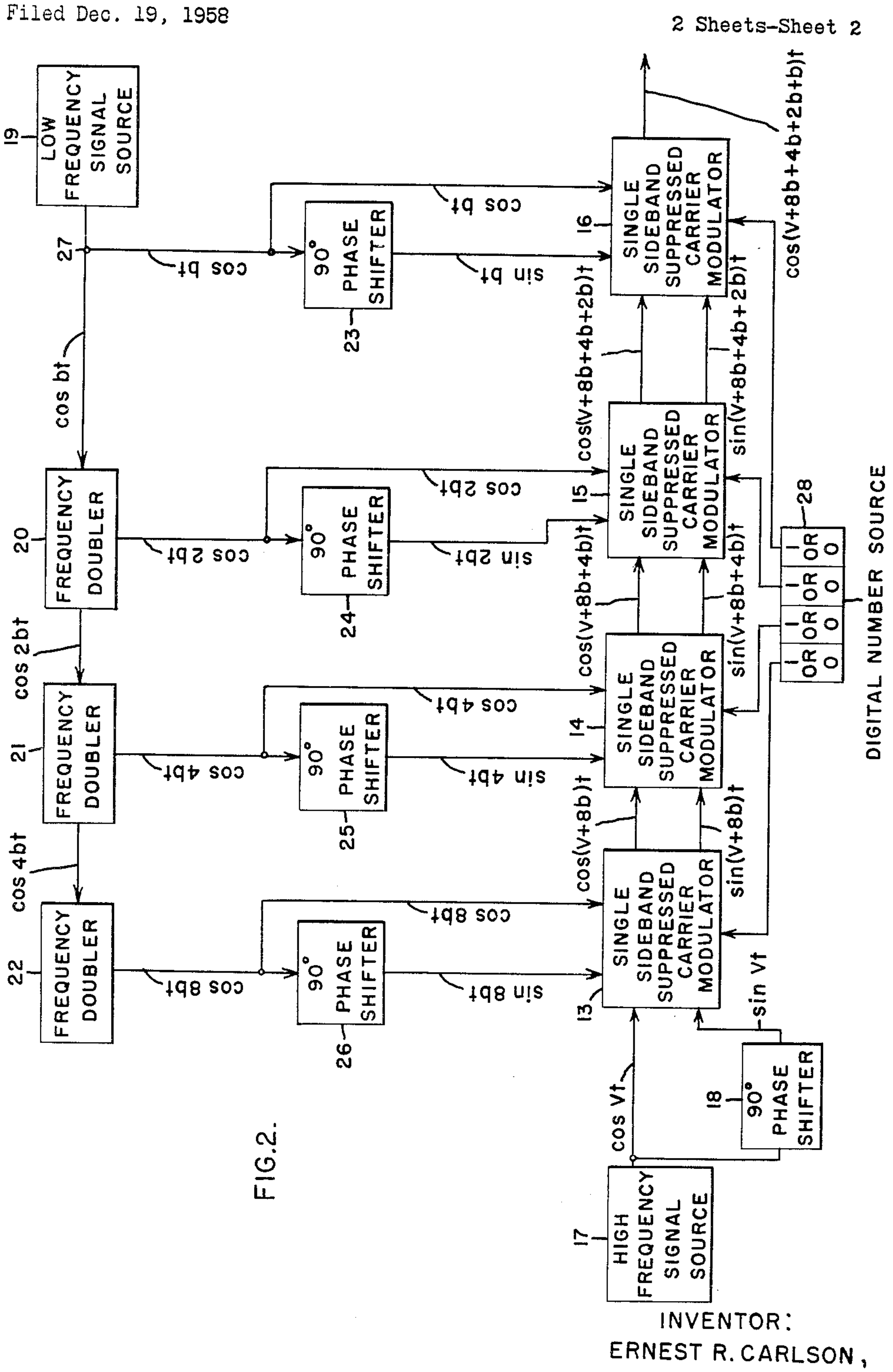
FIG. 2 is a second block diagram illustrative of an embodiment of my invention.

Turning now to FIG. 2, I show a frequency generator constructed in accordance with my invention, which is described as a four-bit system; however, many more bits may be utilized as the need requires. In achieving the objects of my invention, I provide a series of single sideband suppressed carrier modulators 13, 14, 15 and 16 to which I apply a vehicle frequency signal cos $vt$ from signal source 17. A 90° phase shifter 18 shifts the phase of a portion of the vehicle frequency signal to derive quadrature signals necessary to drive a single sideband suppressed carrier modulator and these quadrature components are applied to modulator 13. Each of the modulators 14, 15 and 16 receive as their quadrature driving signal the outputs of modulators 13, 14 and 15 respectively. Modulators 13, 14 and 15 contain in their output circuits a two-phase network for supplying quadrature phase signals to succeeding modulators. This arrangement is more fully explained hereinafter in the discussion of FIG. 3.

Each modulator is supplied with a pair of quadrature phase related modulating signals, the frequency of the modulating signals applied to each modulator being in binary relation. The binarily related frequency modulating signals are derived from a base frequency signal cos $bt$ supplied from signal source 19, which may be any suitable signal source. To achieve a source of signals having binarily related frequencies with each of the binarily related signals having quadrature components, I provide a succession of frequency doublers 20, 21 and 22 and 90° phase shifters 23, 24, 25 and 26. The base frequency signal cos $bt$ is applied to junction 27 from which a portion is fed to frequency doubler 20, and the remainder is applied to modulator 16 after being split into quadrature components by phase shifter 23. A portion of the doubled base frequency signal cos $2bt$ is applied to frequency doubler 21 and the remainder is applied to modulator 15 after being split into a quadrature component by phase shifter 24. In a like manner a modulating frequency signal cos $4bt$ is derived from frequency doubler 21 split into quadrature components cos $4bt$ and sin $4bt$ by phase shifter 25 and supplied to modulator 14. Similarly, the output of frequency doubler 22 is split into quadrature components cos $8bt$ and sin $8bt$ by phase shifter 26 and supplied to modulator 13.

Figure 3:
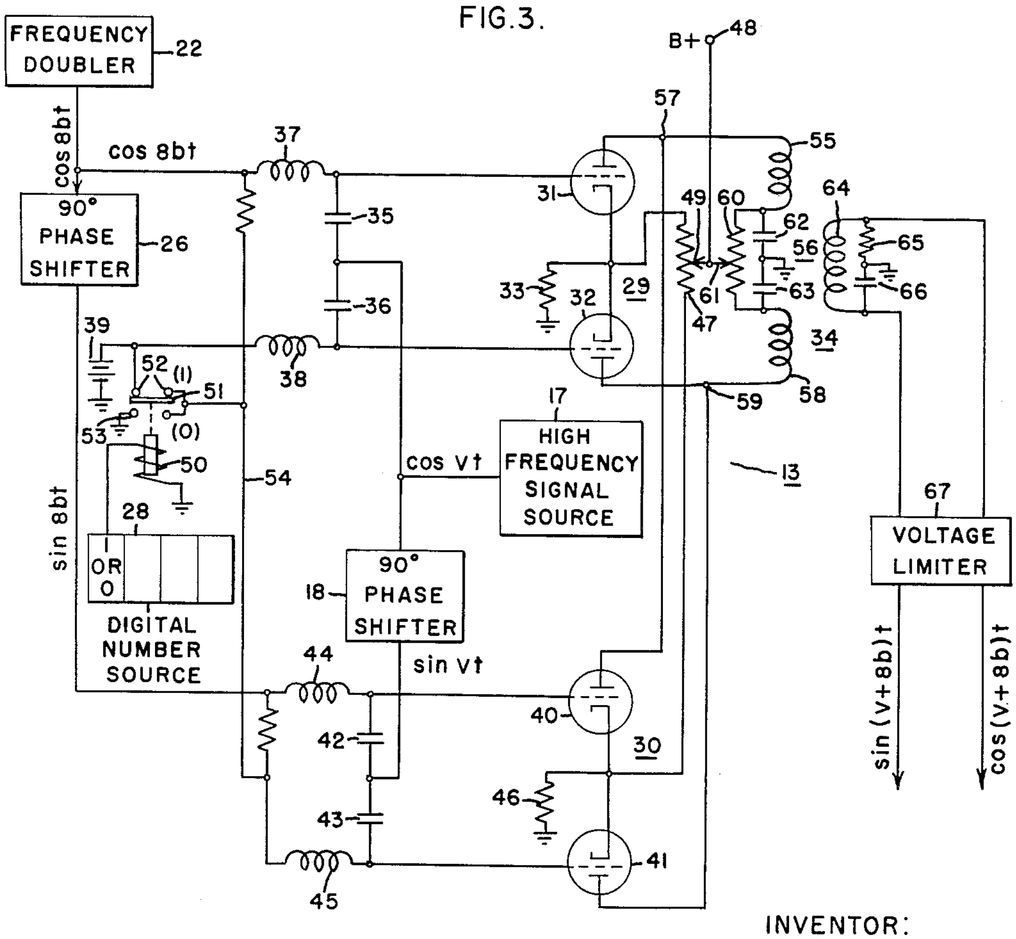
FIG. 3 shows a preferred circuit arrangement used in the practice of my invention, partly in schematic and partly block diagram.

To enable or inhibit modulation of the vehicle frequency, as is explained in detail in conjunction with the discussion of FIG. 3, I provide a digital number source 28, which may comprise a digital readout device of any suitable type such as one using bistable flip-flops, a sensitive shaft position device, a plurality of two position electrically or manually operated switches or any other suitable digital number register. By way of example only, I have shown my digital number source as corresponding in number of bits to the number of modulators. As hereinafter explained, the number of bits may exceed the number of modulators.

The modulating signals appearing at each of the modulators 13, 14, 15 and 16 will or will not modulate the vehicle frequency signal depending on the existence of an enabling signal from the digital number source 28. If the most significant digit is "one," the vehicle signal will be modulated by the $8bt$ frequency and the output signal of modulator 13 will have a frequency equal to the sum of the original vehicle frequency and the modulating frequency. If, however, the most significant digit should be "zero," the vehicle frequency signal will pass modulator 13, unaffected by the modulating signal.

In the output of modulator 13 is a two phase network (not illustrated in FIG. 2), more fully described in conjunction with FIG. 3, which provides quadrature driving signals for succeeding modulator 14. These signals derived from modulator 13, will be acted upon in modulator 14 by modulating signals cos $4bt$ and sin $4bt$ if the second most significant digit is "one," but if the second most significant digit is "zero," the output of modulator 13 will pass to modulator 14 unaffected by the $4bt$ signal frequency.

This operation continues along the serially arranged modulators and the parallel arranged binarily related modulating frequencies. It will be understood that each modulator receives as its two phase driving frequency input the output of the preceding modulator. This input signal frequency represents the vehicle frequency plus all frequency shifts introduced by previous modulators.

Referring now to FIG. 3, there is shown a preferred form of single sideband suppressed carrier modulator used in the practice of my invention. The modulator of FIG. 3 corresponds to modulator 13 of FIG. 2 and it will be noted that the components commonly associated with the modulator in each figure bear like identifying numbers. Single sideband suppressed carrier modulator 13 comprises two balanced modulators 29 and 30. Modulator 29 comprises tubes 31 and 32 of the grid controlled type having a common cathode resistor 33. The plates of tubes 31 and 32 are coupled to an output circuit generally indicated as 34, whose structure and function is hereinafter explained.

One quadrature component, cos $vt$, of the quadrature vehicle frequency signal is supplied to the grids of tubes 31 and 32 in parallel from high frequency source 17 through coupling capacitors 35 and 36 respectively. Radio frequency chokes 37 and 38 prevent the high frequency signal from reaching the modulating frequency source, frequency doubler 22 and grid bias potential source 39. The R-F chokes 37 and 38 offer negligible impedance to the modulating frequency supplied by frequency doubler 22 and D.C. biasing source 39 respectively.

Referring now to balanced modulator 30, which is substantially identical in structure to balanced modulator 29, it is seen that modulator 30 comprises grid controlled tubes 40 and 41. The sin $vt$ component of the quadrature vehicle frequency signal is supplied to the grids in parallel from high frequency source 17 through phase shifter 18 and coupling capacitors 42 and 43. Radio frequency chokes 44 and 45 prevent the vehicle frequency signal from reaching the modulating frequency source phase shifter 26 and D.C. biasing source 39.

The cathodes of tubes 40 and 41 are generally maintained at a predetermined potential by means of a voltage divider network comprising a common cathode resistor 46 and a portion of resistor 47 connected to a positive D.C. voltage source 48 through adjustable contact 49. Likewise the cathodes of tubes 31 and 32 are generally held at a predetermined potential by means of a voltage divider network comprising common cathode resistor 33 and a portion of resistor 47 connected to the positive D.C. voltage source 48 through adjustable contact 49. Generally, it is desirable to have the cathodes of tubes 31 and 32 at the same D.C. potential as the cathodes of tubes 40 and 41; however, in instances hereinafter described it may be desirable to adjust the relative potentials, and this may be done by adjustment of contact 49 on resistor 47.

Considering for the moment the modulation enabling and inhibiting means which comprises digital number source 28, coil 50, D.C. potential source 39, contactor 51 under the control of coil 50 and contacts 52 and 53, it is seen that when contactor 51 closes contacts 52, the grids of all tubes are returned to a positive potential, i.e., direct current biasing potential source 39, through line 54 and contacts 52. However, when contactor 51 closes contacts 53, the grids of tubes 31, 40 and 41 are returned to ground through line 54 and closed contacts 53 and only the grid of tube 32 is returned to a positive potential.

Inasmuch as the cathodes of tubes 31, 32, 40 and 41 are held at a relatively high positive potential with respect to ground, it may be seen that tubes 31, 40 and 41 will be biased non-conductive when their grids are returned to ground. The contactor 51 is under the control of coil 50, and the contacts which are closed are determined by the energization of coil 50. If the most significant digit of the binary digital number appearing at digital number source 28 is "one" a signal indicative of that state causes coil 50 to be energized and contactor 51 will close contacts 52, returning all grids to a positive potential, but if the most significant digit is "zero," the coil 50 will not be energized, contactor 51 will close contacts 53 and only the grid of tube 32 will be returned to a positive potential and the grids of tubes 31, 40 and 41 will be returned to ground. It should be understood that the grid bias means illustrated by the coil-contactor arrangement discussed above is merely shown for purposes of illustration and it will be realized that many other suitable arrangements may occur to those skilled in the art. The manner in which the modulation enabling means affects the operation of the single sideband suppressed carrier modulator is explained hereinafter as the over-all operation of the modulator 13 is described.

Turning now to the output circuit generally indicated as 34, the plates of tubes 31 and 40 are connected to primary winding 55 of transformer 56 through junction point 57. The plates of tubes 32 and 41 are connected to primary winding 58 through junction point 59. Between windings 55 and 58 is a resistor 60 having an adjustable contact 61 which is returned to D.C. plate voltage source 48. Coils 55 and 58 along with parallel capacitance introduced by tubes 31, 32, 40 and 41, wiring, etc. provide parallel resonance at the vehicle frequency and excursions thereof effected by modulation. Capacitors 62 and 63 provide low impedance paths to ground from windings 55 and 58, respectively, of transformer 34. The secondary of the output circuit comprises secondary winding 64 across which is connected a two phase network comprising resistor 65 and capacitor 66. A voltage limiter 67 may also be provided to eliminate possible amplitude modulation of the output signal by spurious high order sidebands.

In describing the over-all operation of the single sideband suppressed carrier modulator, let the digit "one" be the first most significant digit appearing on the digital number source 28. The contactor 51 will close contacts 52. The grids of all tubes 31, 32, 40 and 41 are now at potentials sufficiently positive with respect to their cathodes to render the tubes conductive. The cos $vt$ component of the vehicle frequency signal derived from signal source 17 is applied to the grids of tubes 31 and 32 in parallel through coupling capacitors 35 and 36. Cos $8bt$ is applied to the grid of tube 31 through R-F choke 37 and phase inverter action due to common coupling of the cathodes of tubes 31 and 32 to resistor 33 causes the plate currents of tubes 31 and 32 to be 180° out of phase. The vehicle frequency signal component cos $vt$, since it is applied to the grids of tubes 31 and 32 in parallel, appears on windings 55 and 58 in phase and therefore cancels on the secondary winding 64. Capacitors 62 and 63 each have low impedance at the modulating frequency to provide a low impedance path to ground for the modulating frequency, thus preventing cos $8bt$ from appearing at winding 64. Therefore only the upper, cos $(v+8b)t$, and the lower, cos $(v-8b)t$, sidebands appear on primary windings 55 and 58.

In balanced modulator 30, the sin $vt$ component of the vehicle frequency signal is applied to the grids of tubes 40 and 41 in parallel from phase shifter 18 through coupling capacitors 42 and 43. The sin $vt$ component of the plate currents of tubes 40 and 41 appear on windings 55 and 58 in phase and therefore cancel. The sin $8bt$ component of the modulating signal is applied to the grid of tube 40 through R-F choke 44 from phase shifter 26. Phase inversion due to common cathode resistor 46 causes the plate currents of tubes 40 and 41 to be 180° out of phase and therefore upper, sin $(v+8b)t$, and lower, sin $(v-8b)t$, sidebands appear on windings 55 and 58. Any modulating frequency component, sin $8bt$, of the plate currents is eliminated from the output circuit by tuning of windings 55 and 58 and capacitors 62 and 63.

The lower sidebands generated at each of the balanced modulators 29 and 30 are out of phase by 180° and cancel, not appearing at winding 64. Upper sidebands generated in each of the balanced modulators 29 and 30 are in phase and add. This may be shown mathematically as follows:

The plate currents of the tubes, not considering the term for the carrier which is suppressed, are:

$$Ip\ (31)=\cos vt \cos 8bt \quad (1)$$

$$Ip\ (40)=\sin vt \sin 8bt \quad (2)$$

$$Ip\ (32)=\cos vt \cos 8bt \quad (3)$$

$$Ip\ (41)=\sin vt \sin 8bt \quad (4)$$

I$p$ (31) and I$p$ (40) add to give by trigonometric identity $$\cos (v+8b)t \quad (5)$$

I$p$ (32) and I$p$ (41) add to give by trigonometric identity $$-\cos (v+8)t \quad (6)$$

Since the terms in (5) and (6) appear on windings 55 and 58 180° out of phase, the resultant is additive thereby yielding a single sideband output signal.

The vehicle frequency has now been shifted by an amount indicative of the first most significant binary digit appearing at the digital number source 28. The frequency shifted vehicle signal appears across the phase splitting network comprising resistor 65 and capacitor 66, the portion of the signal appearing across capacitor 66 is 90° out of phase with respect to the portion appearing across resistor 65 and thus the necessary quadrature signals to drive the succeeding modulator 14 (see FIG. 2) are developed.

The voltage limiter 67, following the phase shifting network may be of and suitable circuit configuration and may or may not be included to prevent amplitude modulation of the transmitted sideband by higher order modulation products. The voltage limiter 67 would normally be included only when extremely precise operation is required. Even then it may only be desired in the output circuit of the final modulator.

It should be understood that the circuit is completely balanced; however, should adjustment be necessary to balance out the vehicle frequency signals, this balance may be accomplished by adjustment of contact 61 on resistor 60. Should the sidebands generated in one modulator exceed in voltage magnitude the sidebands generated in the other modulator, an adjustment of contact 49 on resistor 47 may be made to change the D.C. cathode potentials of tubes 31 and 32 of modulator 29 with respect to the D.C. cathode potential of tubes 40 and 41 of modulator 30 to effect balance of the sidebands.

The foregoing description of the operation of the circuit of FIG. 3, contemplates the existence of the digit "one" as the first most significant figure of the digital number source. Should this figure be "zero" coil 50 would be de-energized and contactor 51 would close contacts 53 returning the grids of tubes 31, 40 and 41 to ground through line 54 and closed contacts 53. Inasmuch as the cathode of tube 31 is held substantially above ground by the voltage divider composed of resistor 33 and a portion of resistor 47, tube 31 would be rendered non-conductive. The cathodes of tubes 40 and 41 are also held at a potential substantially above ground by the voltage divider composed of a portion of resistor 47 and cathode resistor 46, thereby rendering tubes 40 and 41 non-conductive. It may readily be seen that when tubes 31, 40 and 41 are rendered non-conductive, modulation of the vehicle frequency signal is inhibited. The grid of tube 32 is still returned to the positive D.C. biasing source 39 and the vehicle frequency component cos $vt$ is applied to the grid of tube 32 which is biased conductive, through coupling capacitor 36, and therefore appears on winding 64 unmodulated.

The unmodulated signal is split into quadrature components cos $vt$ and sin $vt$ and is applied to modulator 14 of FIG. 2. The modulators 13, 14, 15 and 16 are identical and all operate in the manner described above.

As a practical illustration, consider the digital number 1011 to appear on digital number source 28, the vehicle frequency applied to modulator 13 to be 1 megacycle and the base frequency to be 10 kilocycles. With the number 1011 appearing on the digital number source, modulators 13, 15 and 16 would be enabled and modulator 14 inhibited. The output signal from modulator 16 would have a frequency of 1 mc.+80 kc.+20 kc. +10 kc. or 1.11 mc. Should the number appearing on digital number source be 1101, the output signal frequency would be 1 mc.+80 kc.+40 kc.+10 kc. or 1.13 mc. Referring to FIG. 2, the output signal cos $(v+8b+4b+2b+b)t$ is indicative of the binary digital number 1111 appearing on the digital number source 28. Using the same frequencies as above, this frequency would be 1 mc.+80 kc.+40 kc.+20 kc.+10 kc. or 1.15 mc.

It should now be apparent that my frequency generator possesses the accuracy and precision of a digital system. Because all modulating frequencies are derived from a base frequency, all are absolutely accurate with respect to the base frequency and in binary relationship. The accuracy of my frequency generator depends only upon the stability of two signal sources, the vehicle frequency signal source and the base frequency signal source. When used as a check on a data processing system as shown in FIG. 1, the vehicle frequency and the base frequency could be derived from the transmitter frequency and any change in transmitter frequency would cause a corresponding change in the generated frequency. Thus, the system is inherently coherent. For particular applications the number of digits in the digital number register 28 may exceed the number of modulators. This condition may exist when it is desirable to generate or to shift a frequency in accordance with only the most significant binary digital numbers. For example, the digital number register may comprise six bits, yet it may be desired to generate a frequency indicative of only the first four bits.

While I have shown but one application of my invention in FIG. 1, many other applications and uses will be apparent to those skilled in the art. For example, my invention may be used as a multifrequency generator, a Doppler radar simulator, or any system wherein rapid and accurate frequency changing or shifting might be desired. Modifications of the illustrated embodiment of my invention will be readily apparent to one versed in the art; for example, the chain of frequency doublers 20, 21 and 22 of FIG. 2, might be replaced with a chain of frequency dividers and the modulation enabling signals could control passage of the modulating signals at the phase shifters 23, 24, 25 and 26.

While a particular embodiment of my invention has been shown and described together with exemplary applications and uses thereof, it should be understood that my invention is not limited thereto, and I intend in the appended claims to claim all variations which fall within the true spirit and scope of my invention.

What I claim as new and desire to secure by Letters Patent of the United States is:

1. A frequency generator comprising series connected modulators; means for supplying a vehicle frequency signal to the first of said modulators, means for supplying a plurality of modulating signals equal in number to the number of said modulators, the modulating signals having binarily related frequencies, means to apply to each of said modulators a different one of the modulating signals, a source of an intelligence-bearing binary digital number corresponding in number of digits at least to the number of the modulating signals, and means for selectively controlling each of said series connected modulators in response to the binary state of a digit of said digital number so as to add said binarily related frequencies selectively to the vehicle frequency in accordance with the intelligence contained in the binary digital number.

2. The frequency generator of claim 1 wherein said means for supplying signals whose frequencies are in binary relation comprises a chain of frequency doublers.

3. A frequency generator comprising series connected modulators; means to apply a vehicle frequency signal to the first of said series of modulators, means for supplying a plurality of modulating signals equal in number to the number of said modulators, the modulating signals having binarily related frequencies, means to apply to each of said modulators a different one of the modulating signals, a source of an intelligence-bearing binary digital number corresponding in number of digits at least to the number of said modulating signals, and means for selectively enabling or inhibiting the modulating action of each of said modulators in response to the binary state of a different one of said digits in said digital number so as to add the modulating frequencies selectively to the vehicle frequency in accordance with the binary state of said digits.

4. The arrangement of claim 3 wherein said means for supplying signals whose frequencies are in binary relation comprises a chain of frequency doublers.

5. A frequency generator comprising series connected single sideband carrier modulators; means for supplying quadrature components of a vehicle frequency signal to the first of said series of modulators, means for supplying a plurality of modulating signals equal in number to the number of said modulators, the modulating signals having binarily related frequencies, means to derive quadrature phase components of each of the modulating signals and apply to each of said modulators quadrature phase components of a different one of the modulating signals, a source of an intelligence-bearing binary digital number corresponding in number of digits at least to the number of the modulating signals and means comprising said modulators enabled by said digital number source to add the binary related frequencies to the vehicle frequency in accordance with the intelligence contained in the binary digital number.

6. A frequency generator comprising series connected single sideband carrier modulators; means for supplying quadrature phase components of a vehicle frequency signal to the first of said series of modulators, means for supplying a plurality of modulating signals equal in number to the number of said modulators, the modulating signals having binarily related frequencies, means to derive quadrature phase components of each of the modulating signals and apply to each of said modulators quadrature phase components of a different one of the modulating signals, a source of an intelligence-bearing binary digital number corresponding in number of digits at least to the number of the modulating signals, said modulators being enabled by said digital number source to add the modulating frequencies to the vehicle frequency in accordance with the intelligence contained in the binary digital number.

References Cited in the file of this patent

UNITED STATES PATENTS

| | | |
|---|---|---|
| 1,854,986 | Fitch | Apr. 19, 1932 |
| 2,487,857 | Davis | Nov. 15, 1949 |
| 2,494,345 | Manke | Jan. 10, 1950 |
| 2,848,616 | Tollefson | Aug. 19, 1958 |